United States Patent
Bassett et al.

(10) Patent No.: US 6,863,167 B2
(45) Date of Patent: Mar. 8, 2005

(54) DUAL FORMED SPRING COVER

(75) Inventors: Michael L. Bassett, Auburn, IN (US);
Holly B. Ryner, Hamilton, IN (US);
Mark L. Beakas, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/364,779

(22) Filed: Feb. 11, 2003

(65) Prior Publication Data

US 2004/0154897 A1 Aug. 12, 2004

(51) Int. Cl.$^7$ ............................................. F16D 13/68
(52) U.S. Cl. ..................... 192/70.17; 192/212; 464/64; 464/68
(58) Field of Search ............................. 192/70.17, 212; 464/64, 66, 68

(56) References Cited

U.S. PATENT DOCUMENTS

| | | | | |
|---|---|---|---|---|
| 3,556,273 A | * | 1/1971 | Neuweier | ................... 192/214 |
| 4,269,296 A | * | 5/1981 | Flotow et al. | ................. 464/64 |
| 4,351,168 A | * | 9/1982 | Prince et al. | ................. 464/64 |
| 4,485,909 A | * | 12/1984 | Gatewood | .................... 192/203 |
| 4,588,062 A | * | 5/1986 | Caray et al. | ............. 192/214.1 |
| 4,596,324 A | * | 6/1986 | Braun | .................... 192/213.12 |
| 4,789,375 A | * | 12/1988 | Bassett | ......................... 464/68 |
| 5,651,442 A | * | 7/1997 | Murata et al. | ............... 192/212 |
| 5,857,552 A | * | 1/1999 | Hashimoto | ............. 192/213.21 |
| 6,332,843 B1 | * | 12/2001 | Hashimoto | .................... 464/68 |

* cited by examiner

Primary Examiner—Saul Rodriguez
(74) Attorney, Agent, or Firm—Rader, Fishman & Grauer PLLC

(57) ABSTRACT

A driven disk in a clutch comprises a hub having a flange extending radially therefrom and having a spring cover affixed thereto. The spring cover defines at least one spring cavity therein and has two ends. Opposing first portions of the two ends define a first cavity length, and second opposing portions of the two ends define a second cavity length. A first spring is retained within the spring cavity wherein the first spring bears against the first end portions defining the first length. A second spring is also retained within the spring cavity wherein the second spring bears against the second end portions defining the second length.

25 Claims, 5 Drawing Sheets

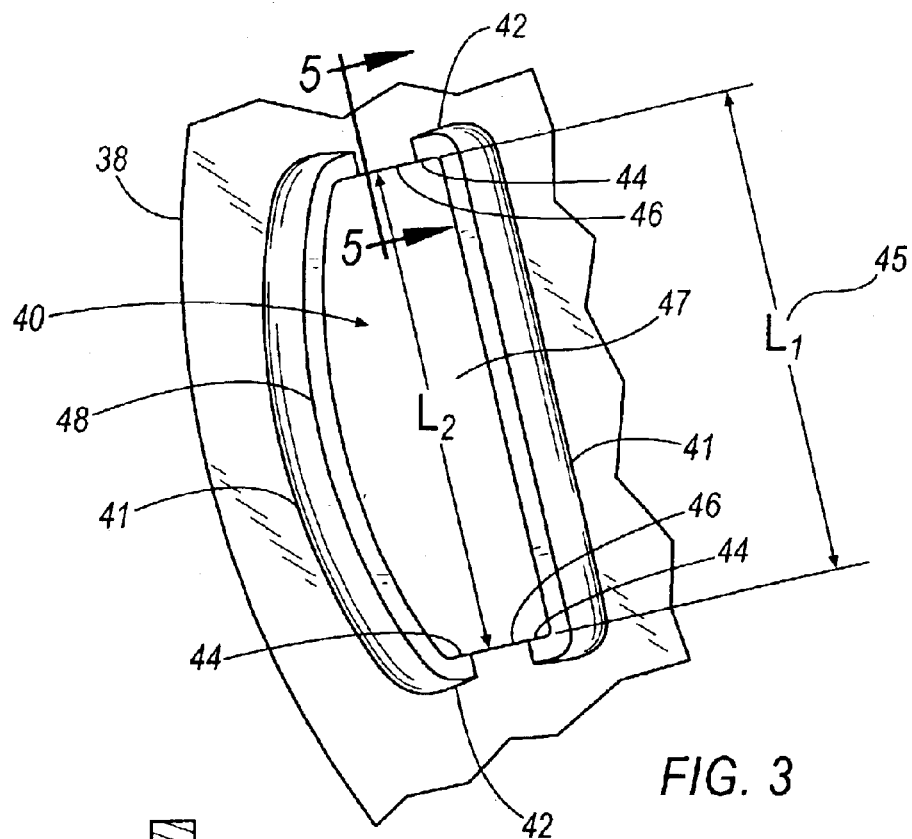
FIG. 3
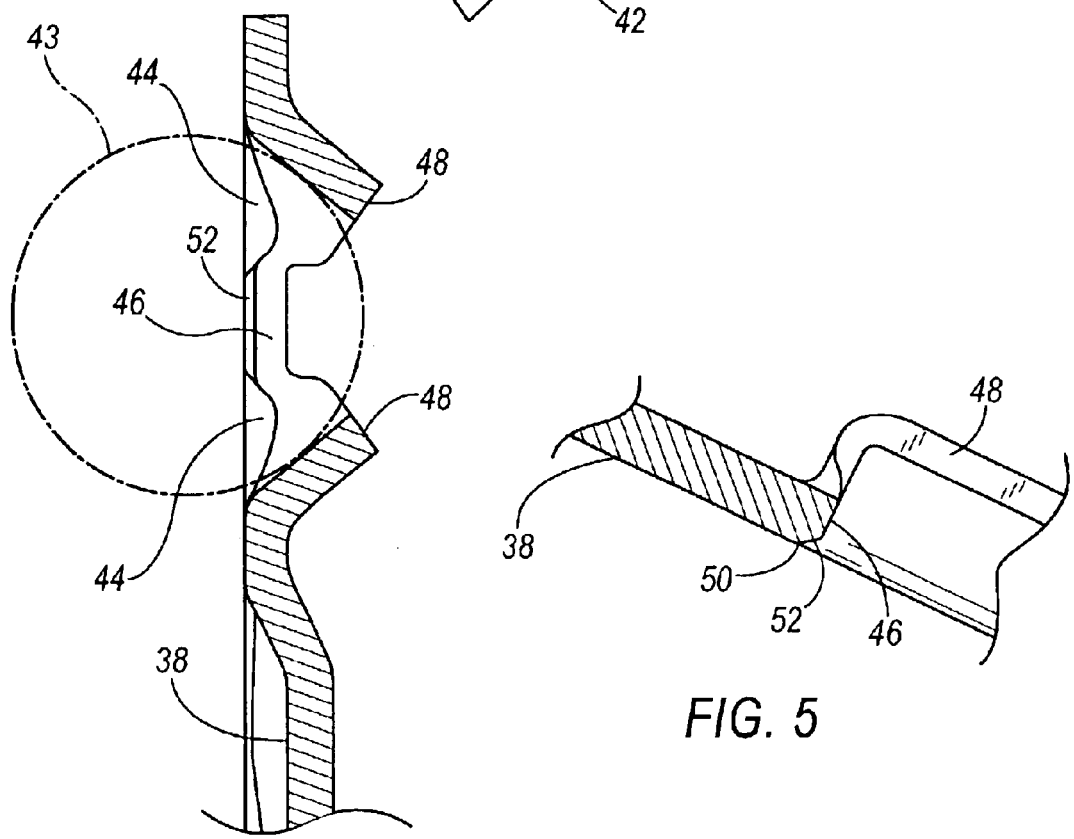
FIG. 4
FIG. 5

DUAL FORMED SPRING COVER

TECHNICAL FIELD

The present invention relates to clutches and more particularly to retention of springs in a driven disk of a clutch.

BACKGROUND OF THE INVENTION

Clutches have been in use in various forms for many years and are readily known in the art. The purpose of a clutch is to selectively engage and disengage a power source output, most commonly a rotating shaft, to a mechanism desired to be driven by the power source. The most commonly known application for a clutch is to interpose the clutch between an automobile engine and a transmission. The most common configuration of a clutch comprises a flywheel coupled to a rotating engine output such as a shaft and a pressure plate axially spaced from the flywheel wherein the pressure plate is movable toward and away from the pressure plate. A driven disk is interposed between the flywheel and pressure plate. The driven disk is rotatably affixed to the transmission and at its outermost radial extremity includes a plurality of facing elements. During operation, when the clutch is engaged, the pressure plate is forced toward the flywheel clamping the driven disk between the pressure plate and the flywheel inducing a frictional force between the pressure plate, flywheel and the respective facing elements. The induced frictional force then causes the engine torque to be transmitted through the clutch to the transmission.

Once sufficient frictional force is produced to hold the driven disk between the pressure plate and the flywheel, the driven disk is accelerated to a rotational speed matching that of the engine. Since engagement of the clutch is controlled by the operator, the clutch is subject to modulation, or variations in the rate of engagement. If the clutch is engaged slowly, a smooth engagement between the engine and transmission is experienced. However, if operator engages the clutch too rapidly, the driven disk can experience an undesirable and noticeable instantaneous acceleration. In order to prevent the instantaneous acceleration a mechanism for damping the undesirable acceleration is incorporated into the clutch. The mechanism generally adopted for providing such damping is to resiliently bias an outer portion of the disk assembly with respect to an inner portion of the disk assembly, thereby permitting a limited rotation of the outer portion with respect to the inner portion. The resilient members are typically a plurality of compression-type coil springs, wherein the ends of the springs engage both the inner and outer portions of the disk assembly. Torque is then transmitted from the inner portion to the outer portion through the plurality of springs. Thus, any undesirable modulation of the clutch manifested as an instantaneous acceleration is absorbed by the plurality of coil springs.

Engine's having a more powerful output or torque require increased spring resistance to provide a desired damping. An efficient means of increasing spring resistance includes placing a smaller spring inside of and coaxially aligned with an outer spring. In this manner the effective spring coefficient can be increased while minimizing the cross-sectional profile of the total spring area. Since the springs are generally held captive in a cavity formed between two spaced apart spring covers, there is often insufficient bearing area at the ends of the spring cavities to support the ends of the smaller diameter inner springs. This is a result of the spring cavities being a full form pocket. The full form has smooth, rounded edges for the spring to rub against during relative motion between the spring and spring cover. However, such a pocket includes ends that do not allow the spring cover to drive the inner one of the coaxial springs. Therefore, in order to provide the desired bearing area against the ends of the inner springs, additional reinforcing plates are affixed to the inner faces of the spring covers. The disk and one or more stack plates are positioned to fill the space between the two reinforcing plates in a manner to permit the desired limited amount of rotation between the disk and stack plates with respect to the inner portion of the disk assembly.

Since the inclusion of the reinforcing plates increases the number of pieces required for the disk plate assembly and the size of the assembly, elimination of the reinforcing plates is desirable to decrease the number of parts, complexity, and time required to assemble the disk assembly.

SUMMARY OF THE INVENTION

One aspect of the present invention is a driven disk in a clutch comprising a hub having a flange extending radially therefrom and having a spring cover affixed thereto. The spring cover defines at least one spring cavity therein and has two ends. Opposing first portions of the two ends define a first cavity length, and second opposing portions of the two ends define a second cavity length. A first spring is retained within the spring cavity wherein the first spring bears against the first end portions defining the first length. A second spring is also retained within the spring cavity wherein the second spring bears against the second end portions defining the second length.

Another aspect of the present invention is a spring cover for a clutch driven disk. The spring cover comprises a first and a second spring cover plate, the first and second spring cover plates are substantially parallel one to the other. Each spring cover plate defines at least one spring cavity aperture therethrough, and each aperture has two opposing ends. Each end comprises a first end portion defining a first length, and a second end portion defining a second length. The spring cavity apertures are aligned one with the other and in combination define a spring cavity therebetween. A formed flange extends around at least a portion of each of the apertures and extends away from an opposite one of the first and second spring plates.

Yet another aspect of the present invention is a spring cover for a driven disk assembly in a clutch. The spring cover comprises a first spring cover plate and an opposing second spring cover plate. Each spring cover plate defines at least one spring cavity aperture therethrough, and opposing spring cavity apertures define a spring cavity sized to receive therein at least two coaxially aligned springs. Opposing sides of each spring cavity aperture are formed as a dimpled flange that define opposing first end portions of the spring cavity, and further wherein a portion of the spring cavity apertures flanked by the dimpled flanges defines opposing second end portions.

These and other advantages of the invention will be further understood and appreciated by those skilled in the art by reference to the following written specification, claims and appended drawings.

BRIEF DESCRIPTION OF THE DRAWINGS

FIG. 3 is an enlarged fragmented view of a portion of a spring cover plate illustrating one of the spring cavities.

FIG. 4 is a cross-sectional view through a spring cavity of the spring cover plate shown in FIG. 1 and taken along the line 4—4, FIG. 1.

FIG. 5 is a cross-sectional view of the end portion of the spring cavity shown in FIG. 3 and taken along the line 5—5, FIG. 3.

DETAILED DESCRIPTION OF THE PREFERRED EMBODIMENT

Figure 1:
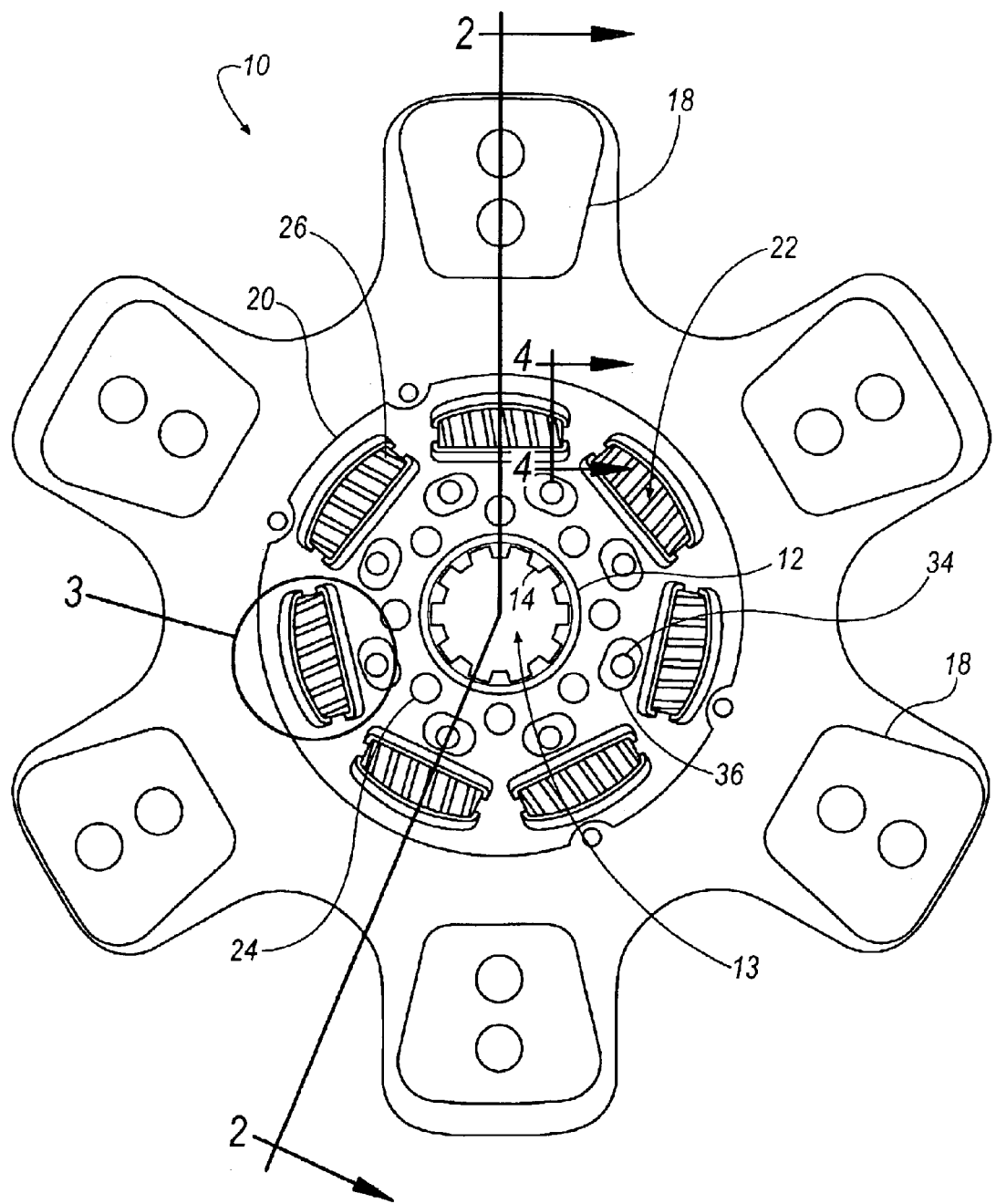
FIG. 1 is a plan view of a driven disk assembly for a clutch embodying the present invention.

For purposes of description herein, the terms "upper", "lower", "left", "rear", "right", "front", "vertical", "horizontal", and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning to the drawings, FIG. 1 illustrates a driven disk assembly 10 for a clutch which is one of the preferred embodiments of the present invention and illustrates its various components.

Figure 2:
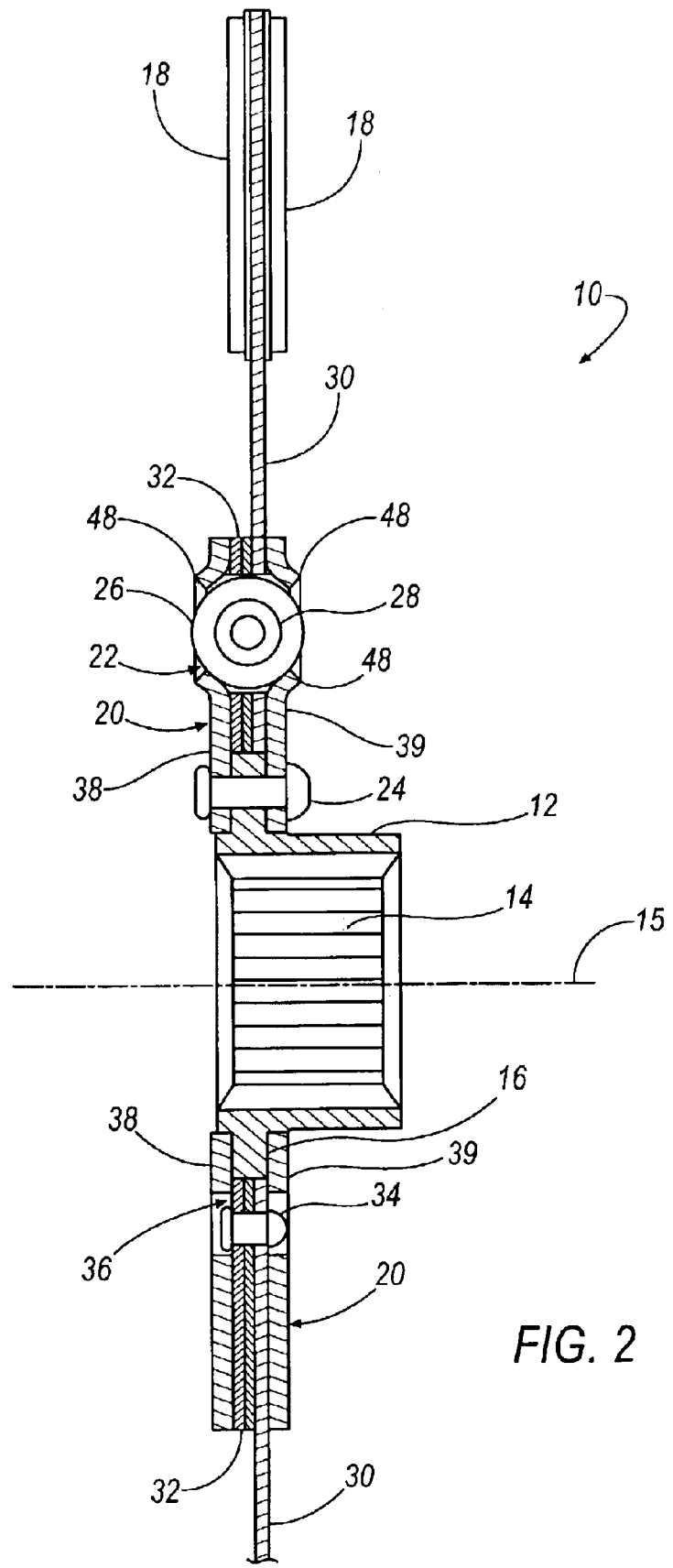
FIG. 2 is a partial cross-sectional view of the driven disk assembly shown in FIG. 1 and taken along the line 2—2, FIG. 1.
Figure 6:
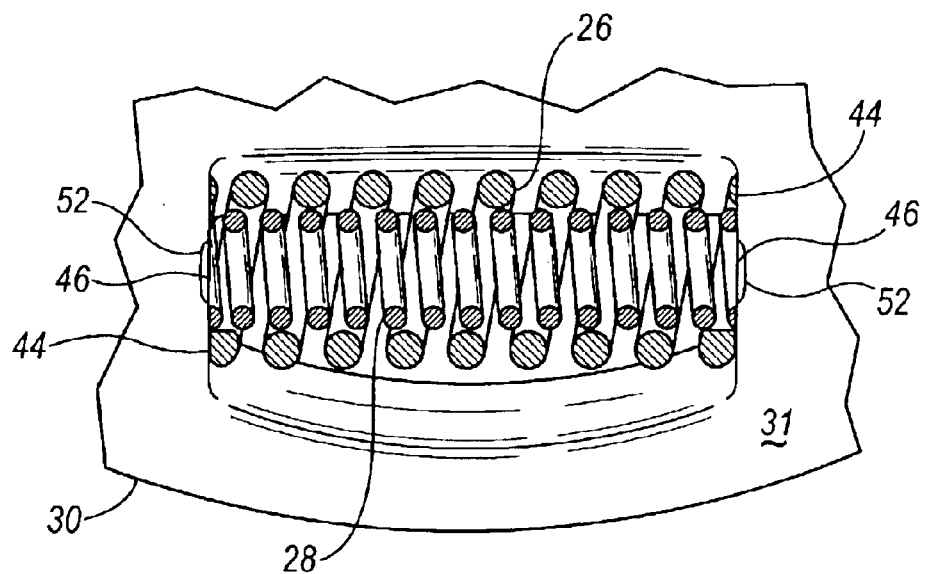
FIG. 6 is an enlarged fragmented view of the spring cavity of FIG. 3 showing a cross sectional view of the installed springs.

Driven disk assembly 10, most easily seen in FIG. 1, includes a hub 12, having a central bore 13 with a plurality of splines 14 extending inwardly therein. Central splined bore 13 is sized to be closely received on a splined input shaft of a torque driven apparatus (not shown) such as a transmission. Splines 14 inter-engage like splines on the input shaft of the torque driven apparatus insuring that hub 12 is rotationally fixed with respect to the input shaft. Hub 12 as illustrated in FIG. 2 includes a hub flange 16 extending radially outward from an outer circumference of hub 12. Hub flange 16 generally defines a plane perpendicular to a rotational axis 15 of driven disk assembly 10. As further illustrated in FIGS. 1–2, a spring cover 20 is affixed to flange 16 by a plurality of damper rivets 24 such that spring cover 20 is in fixed rotational relationship with respect to hub 12. Spring cover 20 has at least one, and most commonly, a plurality of spring cavities 22 circularly arranged proximate to an outer periphery of spring cover 20. Each spring cavity 22 holds captive a first spring 26 which may also be commonly designated as an outer spring and a second spring 28 also commonly referred to as an inner spring. First and second springs 26 and 28 are compression-type coil springs, wherein first spring 26 has a diameter to be closely received within the boundaries of spring cavity 22 and second spring 28 being sized with an outside diameter to be coaxially received within first spring 26. The preferred configuration of spring cavities 22 are discussed in greater detail below.

Driven disk assembly further includes a disk portion comprising a disk plate 30 and one or more stack plates 32. Disk plate 30 and stack plates 32 have a central aperture in which is received flange 16 of hub 12. Disk plate 30 and stack plates 32 are axially aligned one with the others and are fastened together with stack plate rivets 34. However, the assembled disk plate 30 and stack plates 32 are not rigidly affixed to either hub 12 or spring cover 20 but are rotatable about axis 15 with respect to hub 12 and spring cover 20. The combined thickness of disk plate 30 and stack plates 32 is substantially equal to or slightly less than the thickness of flange 16 to insure a non-binding rotation of disk plate 30 and stack plates 32 with respect to hub 12 and spring cover 20.

Spring cover 20 includes a plurality of elongated slots 36 circularly arranged about spring cover 20 and substantially positioned between damper rivets 24 and spring cavities 22. Elongated slots 36 provide clearance along a major axis of the slot 36 for stack plate rivets 34 to permit limited rotation of the assembled disk plate 30 and stack plates 32 with respect to spring cover 20. Disk plate 30 radially extends from spring cover 20 and includes at an outer periphery thereof a plurality of facing members 18 attached to both faces of disk plate 30. Facing members 18 are constructed to provide the frictional interface between driven disk assembly 10 and clutch pressure plates (not shown) forced against facing members 18 to transfer the engine torque to the transmission in a manner that is well-known in the art.

Figure 7:
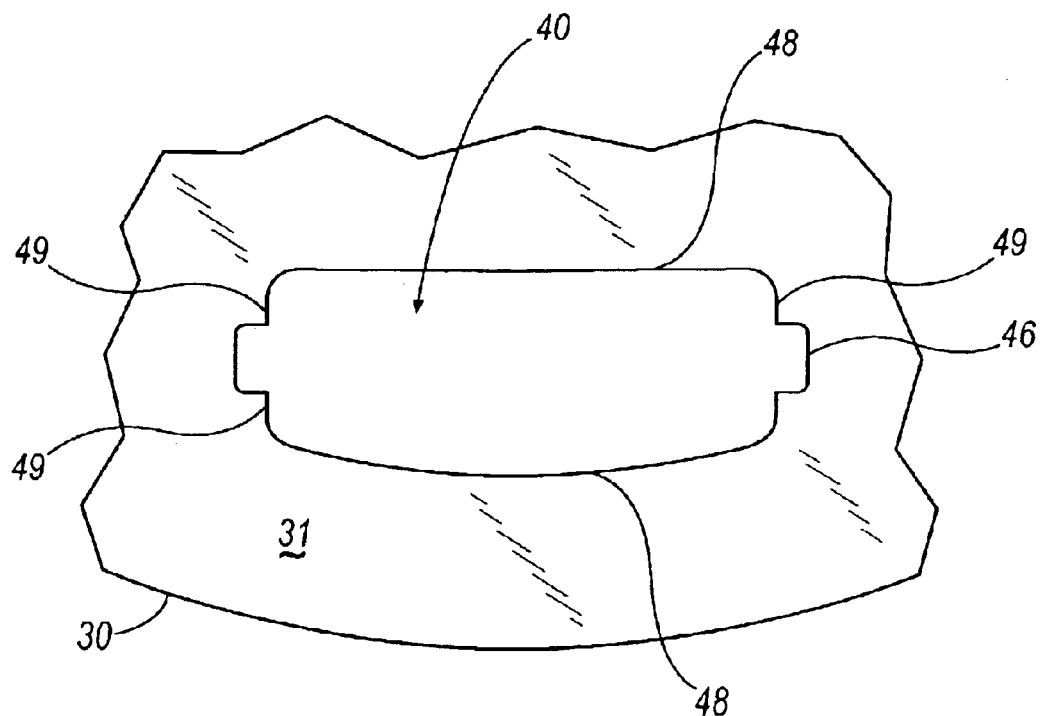
FIG. 7 is an enlarged fragmented view of the spring cavity prior to forming.

As is most easily seen in FIGS. 2-4, spring cover 20 is generally comprised of a first spring cover plate 38 and a second spring cover plate 39. First and second spring cover plates 38 and 39 are substantially identical and are positioned on opposite faces of hub flange 16. First and second spring cover plates 38 and 39 each define a portion of each spring cavity 22. Prior to forming, each location of cavity 22 starts with an aperture 40 as shown in FIG. 7. Aperture 40 is smaller than cavity 22 and is shaped such that flanges 48 and aperture end portions 49 can be dimpled downwardly. Notches in the central portion of each end define second end portions 46. After forming, each cavity portion has sides 41 and ends 42 wherein sides 41 are typically longer than ends 42. Sides 41 of aperture 40 as shown in FIG. 3 are dimpled out of the plane of the plate thereby forming dimpled flanges 48 and defining at least a portion of spring cavity 22. After assembly, first spring 26 is closely received in the formed portion of cavity 22 as illustrated in FIG. 4 showing the outline 43 of spring 26 nested against flanges 48. The width of aperture 40 and the degree of dimpling of flange 40 is determined by the diameter of first spring 26 in a manner known in the art.

Aperture ends 49 are also dimpled downwardly to define first end portions 44 most proximate to sides 41 such that flange 48 extends at least partially from first end portions 44. Oppositely facing first end portions 44 define a first cavity length $L_1$ 45 for abutting opposite ends of first spring 26. A second end portion 46 of end 42 is flanked by end portions 44.

Figure 8:
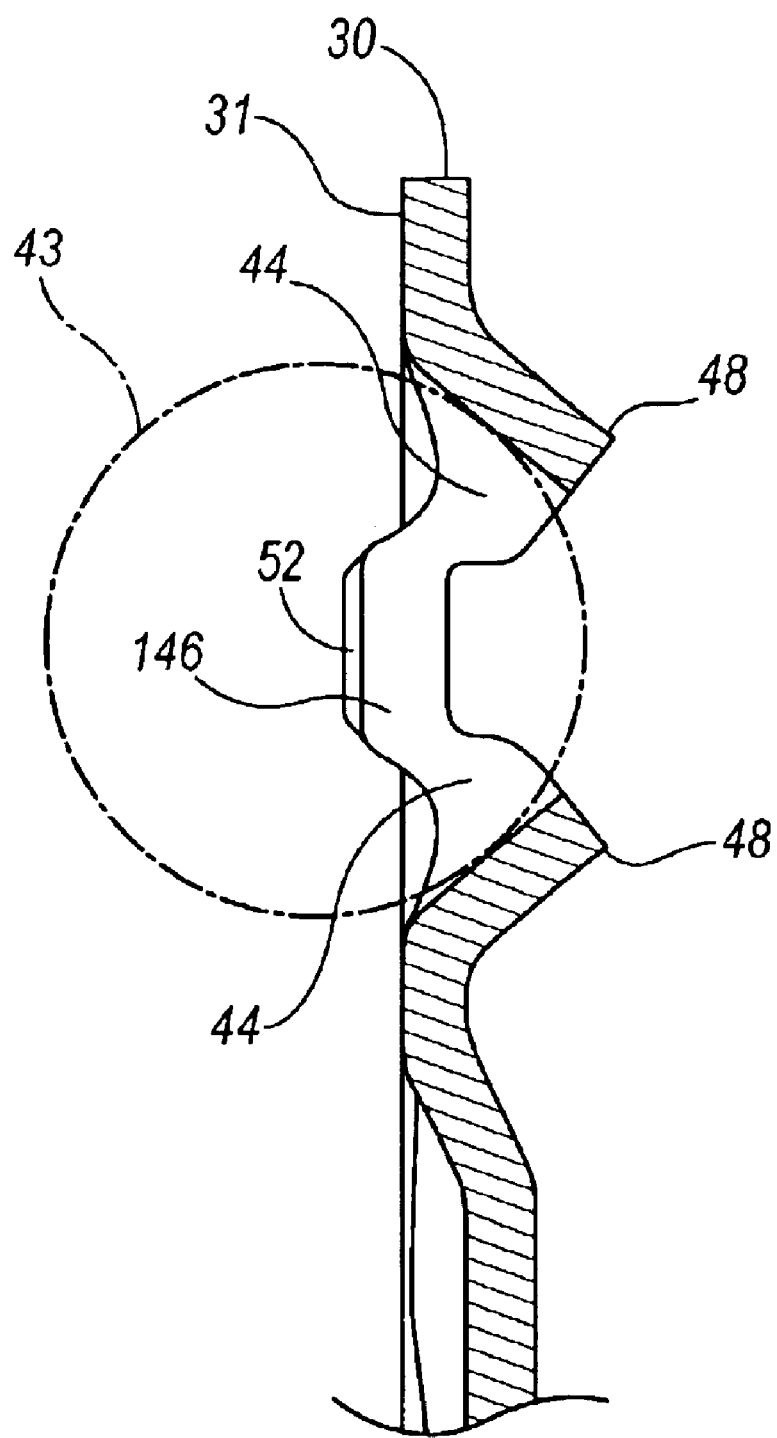
FIG. 8 is a cross-sectional view similar to FIG. 4 illustrating an alternate embodiment of the end portion for bearing on the end of the inner coil spring.

Second end portion 46 is typically not dimpled and substantially remains in the plane of the parent spring cover plate 38 or 39. However, an alternate embodiment as illustrated in FIG. 8 includes a second end portion 146 offset or formed upwardly from the surface plane 31 of disk plate 30. Second end portion 146 as an offset achieves other benefits such as part stability during heat treating or permitting a lower part profile.

Opposing second end portions 46 define a second cavity length $L_2$ 47 and abut the ends of second spring 28. In this manner, the requirement for reinforcing plates can be eliminated, thus simplifying the design, construction and assembly of the driven disk assembly. First and second cavity lengths $L_1$ and $L_2$ are illustrated as being of equal length, but may also be of different lengths depending upon the lengths and mechanical characteristics of first and second springs 26 and 28. First and second cavity lengths $L_1$ and $L_2$ are generally shorter than the completely relaxed lengths of first and second springs 26 and 28 therefore requiring springs 26 and 28 to be at least slightly compressed to install in spring cavities 22. This embodiment retains the desirable features of a formed cavity while interrupting the form at the end of the cavity. The interruption takes the form of second end portion 46 which is primarily flat to bear against the ends of second spring 28 and thereby permits the driving of second spring 28 by spring plates 38 and 39 instead of the previous requirement to incorporate separate reinforcing plates. Elimination of the reinforcing plate permits cavities 22 to have a deeper form and thereby increase the bearing area of first end portions 44 on first springs 26.

Since second end portion 46 is generally perpendicular to the plane of the spring cover plate 38 or 39 and because spring 28 is axially received within first spring 26 the assembler may have difficulty in properly placing second spring 28 in engagement with second end portions 46. To provide a degree of guidance for the end of second spring 28, and as most clearly shown in FIG. 5, a top edge 50 of second end portion 46 adjacent to the face of spring cover plate 38 or 39 opposite from flange 48 a chamfer 52 is formed thereon. Chamfer 52 is generally formed at approximately a 45 degree angle and is generally equal to or less than one-fourth the thickness of the parent material of spring cover plates 38 and 39.

As again shown in FIG. 2, when first and second spring cover plates 38 and 39 are affixed to flange 16 of hub 12 to form spring cover 20, plates 38 and 39 are placed in oppositely facing directions in a manner such that flanges 48 extend away from the assembled disk plate 30 and stack plates 32. The apertures 40 in each of spring cover plates 38 and 39 are rotationally aligned such that apertures 40 are laterally aligned one with another. Disk plate 30 and stack plates 32 also include elongated apertures corresponding to spring cavities 22 such that opposing ends of the like apertures also bear against first and second springs 26 and 28 in a manner like first and second end portions 44 and 46.

In operation, when the engine is operating and the clutch is disengaged, the pressure plates are not in engagement with facing members 18. Driven disk assembly 10 and all its elements rotate about axis 15, the axis of the torque driven apparatus splined input shaft received in splined bore 14, and the pressure plate rotates at the same speed as the engine. When the clutch is engaged by an operator, the rotating pressure plates are increasingly forced against facing members 18 until the frictional force generated therebetween is sufficient to cause the pressure plates to become rotationally engaged with driven disk assembly 10. Rapid modulation of the clutch, without the damping effect of the springs, at the moment of engagement would result in the driven disk assembly 10 experiencing an instantaneous acceleration thus creating an undesirable jolt noticeable to the operator. The jolt causes disk plate 30 and stack plates 32, since they are marginally rotatable about hub 12, to bear on one end of first and second springs 26 and 28. In turn, the other end of springs 26 and 28 bear against first and second end portions 44 and 46 in spring cover plates 38 and 39. The compressible resilience of springs 26 and 28 provides a smoother engagement of the pressure plates with disk plate 30 and facing members 18.

In the foregoing description those skilled in the art will readily appreciate that modifications may be made to the invention without departing from the concepts disclosed herein. Such modifications are to be considered as included in the following claims, unless these claims expressly state otherwise.

We claim:

1. A driven disk assembly in a clutch comprising:
   a hub having a flange extending radially therefrom;
   a spring cover affixed to said flange, said spring cover defining at least one spring cavity therein, said spring cavity having two ends, opposing first end portions of said two ends defining a first cavity length, and opposing second end portions of said two ends defining a second cavity length;
   a first spring retained within said spring cavity, said first spring bearing against said first end portions defining said first length;
   a second spring retained within said spring cavity, said second spring bearing against said second end portions defining said second length;
   wherein said spring cover includes at least one spring cover plate, said spring cover plate having a spring cavity aperture defining a portion of said spring cavity therethrough wherein each edge of said spring cavity aperture is formed as a flange extending away from said spring cover plate; and
   wherein said flange does not extend from said second end portions.

2. A driven disk assembly according to claim 1 further comprising a disk plate captively retained by said spring cover, said disk plate at least partially rotatable with respect to said spring cover, and defining an aperture therethrough wherein said aperture includes ends having first and second end portions at least as long as and aligned with said spring cavity end portions.

3. A driven disk assembly according to claim 2, wherein said disk plate is captured between at least two of said spring cover plates.

4. A driven disk assembly according to claim 2, wherein a portion of said second end portions include a chamfer for guiding ends of said second spring during insertion of said second spring into said spring cavity.

5. A driven disk assembly according to claim 2, wherein said second end portion is offset from a plane defined by said disk plate.

6. A driven disk assembly according to claim 1, wherein said first and said second springs are coil springs.

7. A driven disk assembly according to claim 6, wherein said second spring is coaxial with said first spring.

8. A spring cover for a driven disk assembly in a clutch, said spring cover comprising:
   a first and a second spring cover plate, said first and second spring cover plates being substantially parallel one to the other;
   each said spring cover plate defining at least one spring cavity aperture therethrough, each said spring cavity aperture having two ends, each said end comprising a first end portion and a second end portion, opposing ones of said first end portions defining a first length of said spring cover aperture, and opposing ones of said second end portions defining a second length of said spring cover aperture, said spring cavity apertures aligned one with the other and in combination defining a spring cavity therebetween;
   a formed flange around at least a portion of said apertures, said formed flange extending away from an opposite one of said first and second spring cover plates; and wherein said flange does not extend from said second end portions.

9. A spring cover according to claim 8, wherein said second length is equal to said first length.

10. A spring cover according to claim 8, wherein each said second end portion is substantially centered along each end of said at least one spring cavity aperture.

11. A spring cover according to claim 8, wherein each said second end portion is offset from a plane defined by said first and second spring cover plates.

12. A spring cover according to claim 8, wherein an edge of said second end portion is at least partially chamfered and opposite said flange.

13. A spring cover for a driven disk assembly in a clutch, said spring cover comprising:
   a first spring cover plate and an opposing second spring cover plate;
   each said spring cover plate defining at least one spring cavity aperture therethrough; opposing spring cavity apertures defining a spring cavity sized to receive therein at least two coaxially aligned springs; wherein opposing sides of each spring cavity aperture are formed as a flange that define opposing first end portions of said spring cavity, and wherein a portion of said spring cavity apertures flanked by said flanges defines opposing second end portions; and
   wherein an edge of said second end portion is at least partially chamfered and said chamfered edge is opposite said flange.

14. A spring cover for a driven disk assembly in a clutch, said spring cover comprising:
   a first and a second spring cover plate, said first and second spring cover plates being substantially parallel one to the other;
   each said spring cover plate defining at least one spring cavity aperture therethrough, each said spring cavity aperture having two ends, each said end comprising a first end portion and a second end portion, opposing ones of said first end portions defining a first length of said spring cover aperture, and opposing ones of said second end portions defining a second length of said spring cover aperture, said spring cavity apertures aligned one with the other and in combination defining a spring cavity therebetween;
   a formed flange around at least a portion of said apertures, said formed flange extending away from an opposite one of said first and second spring cover plates; and
   wherein said second length is not equal to said first length.

15. A spring cover according to claim 14, wherein each said second end portion is substantially centered along each end of said at least one spring cavity aperture.

16. A spring cover according to claim 14, wherein each said second end portion is offset from a plane defined by said first and second spring cover plates.

17. A spring cover according to claim 14, wherein an edge of said second end portion is at least partially chamfered and opposite said flange.

18. A spring cover according to claim 14, wherein said flange does not extend from said second end portions.

19. A driven disk assembly in a clutch comprising:
   a hub having a flange extending radially therefrom;
   a spring cover affixed to said flange, said spring cover defining at least one spring cavity therein, said spring cavity having two ends, opposing first end portions of said two ends defining a first cavity length, and opposing second end portions of said two ends defining a second cavity length;
   a first spring retained within said spring cavity, said first spring bearing against said first end portions defining said first length;
   a second spring retained within said spring cavity, said second spring bearing against said second end portions defining said second length;
   wherein said spring cover includes at least one spring cover plate, said spring cover plate having a spring cavity aperture defining a portion of said spring cavity therethrough wherein each edge of said spring cavity aperture is formed as a flange extending away from said spring cover plate; and
   wherein said flange is interrupted at said second end portions.

20. A driven disk assembly according to claim 19 further comprising a disk plate captively retained by said spring cover, said disk plate at least partially rotatable with respect to said spring cover, and defining an aperture therethrough wherein said aperture includes ends having first and second end portions at least as long as and aligned with said spring cavity end portions.

21. A driven disk assembly according to claim 19, wherein said disk plate is captured between at least two of said spring cover plates.

22. A driven disk assembly according to claim 19, wherein a portion of said second end portions include a chamfer for guiding ends of said second spring during insertion of said second spring into said spring cavity.

23. A driven disk assembly according to claim 19, wherein said second end portion is offset from a plane defined by said disk plate.

24. A driven disk assembly according to claim 19, wherein said first and said second springs are coil springs.

25. A driven disk assembly according to claim 24, wherein said second spring is coaxial with said first spring.

* * * * *